Patented Aug. 15, 1950

2,518,509

UNITED STATES PATENT OFFICE 2,518,509

POLYMERIZATION PRODUCTS OF CONJUGATED DIENES, VINYL COMPOUNDS, AND VINYL ESTERS AND PROCESS FOR PRODUCING THE SAME

Karl H. Weber, Chevy Chase, Md., and Paul O. Powers, Columbus, Ohio, assignors to Armstrong Cork Company, Lancaster, Pa., a corporation of Pennsylvania No Drawing. Application May 3, 1949, Serial No. 91,234

15 Claims. (Cl. 260—79.5)

This application is a continuation-in-part of our copending application Serial No. 461,784, filed October 12, 1942 and now abandoned.

This invention relates to copolymers of a conjugated diene, a selected unsaturated compound, and an ester of vinyl alcohol and process for producing such copolymers, and more particularly relates to the process of and materials produced by polymerizing three such compounds; and is primarily concerned with the rubberlike materials which are produced by polymerizing in an aqueous emulsion three compounds comprising a conjugated diene; at least one compound selected from the group consisting of styrene, methylstyrene, para-methyl-alpha-methylstyrene, and acrylonitrile; and a vinyl ester of at least one acid selected from the group consisting of monocarboxylic aliphatic acids containing at least twelve and not more than twenty-four carbon atoms, all as more fully hereinafter set forth.

It is an object of this invention to provide novel polymeric compounds and process for producing the same, and to provide novel materials and especially rubberlike materials. These and other novel features and novel combinations of features will appear more clearly in the following description.

The materials of our invention may be produced by copolymerizing the primary or starting materials in an aqueous emulsion somewhat similar to the well-known manner of polymerizing butadiene and styrene in an aqueous emulsion. The polymerizing emulsion is formed with the aid of an emulsifying agent which may be an aliphatic-alicyclic acid-ethanolamine salt, and preferably includes an ethanolamine to aid in emulsification when free acid may be present. A polymerization catalyst, such as ammonium persulphate is preferably added to the emulsion to expedite polymerization and the emulsion may or may not include a polymerization regulator, such as carbon tetrachloride. The emulsion is agitated in a closed vessel to cause polymerization.

Upon polymerization, a latexlike emulsion is formed that is similar to natural rubber latex. The latexlike emulsion is precipitated by an electrolyte, such as sodium chloride or acetic acid, or an organic nonsolvent, to precipitate rubberlike material which is somewhat similar to raw natural rubber. The rubberlike material is washed and dried and is treated or compounded according to the use to which the final product is to be put. Especially when this material is to be vulcanized, it is broken down or masticated between closely set rolls and about two per cent of antioxidant is preferably milled in at this time. Where, for instance, the rubberlike material is to be used in tread stock for automobile tires, it is compounded with substantially the same ingredients usually compounded with natural rubber.

The vinyl esters which we may employ are the esters of aliphatic and alicyclic acids or mixtures of such acids, such as those obtainable from naturally occurring vegetable and mineral oils. We may employ the vinyl esters of linseed oil acids, soya bean oil acids, cottonseed oil acids, hydrogenated cottonseed oil acids, lard oil acids, perilla oil acids, tall oil acids, rapeseed oil acids, castor oil acids, isomerized castor oil acids, menhaden oil acids, whale oil acids, rosin acids, and the like or mixtures thereof, or we may employ the vinyl ester of a single oil acid such as pure or substantially pure vinyl oleate or vinyl stearate. Vinyl oleate is representative of the vinyl esters of the unsaturated acids and vinyl stearate is representative of the vinyl esters of the saturated acids. The acids derived from tall oil are essentially a mixture of fatty acids, abietic acid, and related rosin acids. The other acids are essentially mixtures of fat and fatty acids containing 12 or more carbon atoms. All of these acids are from the group consisting of aliphatic monocarboxylic acids containing at least 12 and not more than 24 carbon atoms. Of the unsaturated acids in this group, we prefer to use esters of those acids having only ethylenic unsaturation, but other types of unsaturation may be present. We also prefer to use esters of unsubstituted acids, but esters of substituted acids containing a substituent which does not interfere with the polymerization process may, of course, be used. An example of such a material is an ester of castor oil acids, which contain hydroxyl substituents.

The vinyl esters may be prepared in any suitable manner such as by reacting acetylene with the acids or may be prepared as set forth in United States Patent No. 2,066,075. The vinyl esters, as we normally employ them, usually comprise a mixture of both saturated and unsaturated acid esters and contain some impurities including some free acid. It should be understood that the pure or substantially pure esters may be used and that a single ester, such as vinyl oleate, may be used.

While we do not want to be limited to the following theory, it is believed that, upon polymerization, a three compound copolymer is formed containing segments of all reacting materials. Such materials are generally referred to as tripolymers.

The following examples, in which the parts are given by weight, illustrate but are not intended to limit our invention to the exact proportions or materials or procedures set forth.

Example I

An aqueous polymerizing emulsion was prepared according to the following formula:

165 parts butadiene-1,3
65 parts para-methyl-alpha-methylstyrene
25 parts vinyl esters of linseed oil acids
300 parts water
10 parts 2-methyl-2-amino-1-propanol oleate
1 part 2-methyl-2-amino-1-propanol
0.5 part ammonium persulphate The acids derived from linseed oil comprise about 12% saturated acids, 5% oleic acid, 48% linoleic acids, and 35% linolenic acid. The vinyl esters prepared from such acids had an acid number of 8.4 and the 2-methyl-2-amino-1-propanol reacts with the excess acid to neutralize the acid and form an additional amount of emulsifying agent.

The aqueous emulsion was agitated in a closed vessel at a temperature of about 25° C. to cause polymerization and the formation of a latexlike emulsion similar to natural rubber latex. The precipitated rubberlike material, which was collected by pouring the latexlike emulsion into a dilute acetic acid solution to cause coagulation, was washed and dried by masticating it between closely set rolls. A yield of about 245 parts of rubberlike material was obtained.

A typical tire tread stock was compounded with this rubberlike material according to the following formula:

100 parts rubberlike material
40 parts channel black
5 parts zinc oxide
2 parts stearic acid
2.25 parts sulphur
1.2 parts "Santocure" (reaction product of cyclohexylamine and mercaptobenzothiazole)

This tire tread stock was cured for ninety-five minutes under pressure and at a temperature of about 258° F. The cured stock had a tensile strength of 5230 pounds per square inch and an elongation of 580% at break. This cured stock had remarkable tear resistance and possessed markedly better tear resistance than any available commercial sample of a butadiene-styrene copolymer type synthetic rubber. For instance, when a cut or nick is made in the edge of a sheet of this stock and an attempt is made to tear the sheet, the line of tear will double back or curl back in about the same manner as highly tear-resistant natural rubber compounds tear. In fact, this material has better tear resistance than similarly compounded natural rubber compounds.

While we do not wish to be limited to the following theory, the remarkable tear-resistant quality of this rubberlike material is apparently imparted thereto by the vinyl esters of linseed oil acids.

Example II

An aqueous polymerizing emulsion was prepared according to the following example:

165 parts butadiene-1,3
65 parts styrene
25 parts vinyl esters of soya bean oil acids (acid No. 9.2)
300 parts water
10 parts 2-methyl-2-amino-1-propanol oleate
1 part 2-methyl-2-amino-1-propanol
0.5 part ammonium persulphate The acids derived from soya bean oil comprise about 10% saturated acids, 35% oleic acid, 53% linoleic acid, and about 2% linolenic acid.

The polymerizing emulsion was polymerized according to Example I and a yield of about 245 parts of rubberlike material was obtained. A tire tread stock was compounded with this rubberlike material according to Example I. The stock was cured for thirty minutes at 290° F. and had a tensile strength of 3,290 pounds per square inch and an elongation of 390% at break.

Example III 162.5 parts butadiene-1,3
50 parts para-methyl-alpha-methylstyrene
37.5 parts vinyl esters of coconut oil acids (acid No. 2.6)
300 parts water
15 parts 2-methyl-2-amino-1-propanol oleate
1.5 parts 2-methyl-2-amino-1-propanol
0.5 part ammonium persulphate The acids derived from coconut oil largely comprise saturated acids containing twelve to eighteen carbon atoms.

The emulsion was agitated and then coagulated. The precipitated rubberlike material was compounded according to Example I and then cured for twenty minutes at 290° F. The cured stock had a tensile strength of 2,490 pounds per square inch and an elongation of 430% at break.

Example IV

An aqueous polymerizing emulsion was prepared according to the following formula:

162.5 parts butadiene-1,3
50 parts para-methyl-alpha-methylstyrene
37.5 parts vinyl esters of cottonseed oil acids (acid No. 6)
300 parts water
10 parts 2-methyl-2-amino-1-propanol oleate
1 part 2-methyl-2-amino-1-propanol
0.5 part ammonium persulphate The acids derived from cottonseed oil comprise about 20% of saturated acids, 30% oleic acid, and 50% linoleic acid. This polymerizing emulsion was agitated in a closed vessel and a yield of 248 parts of rubberlike material was obtained. This rubberlike material was compounded according to Example I for a tire tread stock. The compound was cured ninety-five minutes at 258° F. and was then found to have a tensile strength of 2,890 pounds per square inch and an elongation of 380% at break.

Example V

An aqueous polymerizing emulsion was prepared according to the following formula:

162.5 parts butadiene-1,3
50 parts methylstyrene
37.5 parts vinyl esters of perilla oil acids (acid No. 9.2)
300 parts water
10 parts 2-methyl-2-amino-1-propanol oleate
1 part 2-methyl-2-amino-1-propanol
0.5 part ammonium persulphate The acids of perilla oil comprise about 7% saturated acids, 3% oleic acid, 45% linoleic acid, and 45% linolenic acid. The emulsion was polymerized and the rubberlike material precipitated according to Example I. This rubberlike material was compounded according to Example I to form a tire tread stock and the stock was cured for twenty minutes at 290° F. The cured rubberlike material had a tensile strength of 1500 pounds per square inch and an elongation of 440% at break.

*Example VI*

An aqueous polymerizing emulsion was prepared according to the following formula:

162.5 parts butadiene-1,3
50 parts styrene
37.5 parts vinyl esters of refined tall oil acids (acid No. 7.5)
300 parts water
10 parts 2-methyl-2-amino-1-propanol oleate
1.5 parts 2-methyl-2-amino-1-propanol
0.5 part ammonium persulphate The tall oil comprises about 55% to 60% fatty acids and about 34% to 38% rosin acids. The rosin acids essentially comprise abietic acid.

The emulsion was agitated for twenty-four hours at a temperature of 50° C. and then agitated for forty-eight hours at a temperature of 25° C. The resulting rubberlike material was compounded according to Example I and then cured for eighty-five minutes at 258° F. The cured stock had a tensile strength of 2,490 pounds per square inch and an elongation of 310% at break.

*Example VII*

An aqueous polymerizing emulsion was prepared according to the following formula:

162.5 parts butadiene-1,3
50 parts para-methyl-alpha-methylstyrene
37.5 parts vinyl oleate
300 parts water
10 parts 2-methyl-2-amino-1-propanol oleate
1 part 2-methyl-2-amino-1-propanol
0.5 part ammonium persulphate The rubberlike material was formed and compounded according to Example I and then cured for twenty minutes at 290° F. The cured tire tread stock had a tensile strength of 2,460 pounds per square inch and an elongation of 450% at break.

*Example VIII*

An aqueous polymerizing emulsion was prepared according to the following formula:

162.5 parts butadiene-1,3
50 parts acrylonitrile
37.5 parts vinyl esters of soya bean oil acids (acid No. 9.2)
300 parts water
15 parts 2-methyl-2-amino-1-propanol oleate
1.5 parts 2-methyl-2-amino-1-propanol
0.7 part ammonium persulphate The emulsion was polymerized and the rubberlike material was compounded according to Example I to form a tire tread stock. The stock was cured for thirty minutes at 290° F. and was found to have a tensile strength of 2,310 pounds per square inch and an elongation of 330% at break.

In each of the foregoing examples the aqueous emulsion was agitated in a closed vessel to cause polymerization. It has been found that raising the temperature of the emulsion to about 50° C. to 60° C. shortens the period required for polymerization; but when the polymerization period is shortened, there is a tendency to form a copolymer which, when compounded, has a lower tensile strength. The period required for polymerization is dependent both on the materials being polymerized and on the qualities desired in the final product.

The raw rubberlike materials may be compounded with materials other than those set forth and may or may not be vulcanized according to the use to which the finished product is to be put. Further, the exact proportions of reactants used for manufacturing an article containing our rubberlike material will be dependent, at least partially, on the particular use for the material.

Generally speaking, in order to produce rubberlike materials of the type disclosed herein we employ a polymerizable mixture containing at least about 50% by weight of conjugated dienes, up to about 35% by weight of selected compound such as styrene, and about 5% to 15% by weight of selected vinyl ester. We have obtained particularly advantageous results by subjecting to emulsion polymerization conditions a mixture containing about 60% to 75% by weight conjugated diene, about 15% to 25% selected compound such as styrene, and about 5% to 15% by weight of selected vinyl ester.

The butadiene may be wholly or partially replaced with other open chain aliphatic conjugated dienes, such as isoprene, chloroprene, piperylene, and the like. We prefer to employ those dienes containing 4 to 6 carbon atoms. Many of the polymerization products of the other conjugated dienes are relatively soft and may not be particularly useful for automobile tires, but may, for instance, be compounded and/or vulcanized for use in other rubber articles or rubber cements.

As used herein the term "rubberlike material" or its equivalent shall include the raw rubberlike precipitate, the compounded rubberlike material, and any other rubberlike product of the polymerization product.

Modifications may be made in the formulae and processes set forth and some features may be used without others, all without departing from the spirit or scope of the invention. For instance, other emulsifying agents and polymerization catalysts may be used. Further, while polymerization is preferably effected in an aqueous emulsion, the claims are not limited to this method of polymerization, unless otherwise stated.

We claim:

1. A composition of matter comprising the polymerization product of about 165 parts of butadiene-1,3; about 65 parts by weight of para-methyl-alpha-methylstyrene; and about 25 parts by weight of vinyl esters of linseed oil acids.

2. A composition of matter comprising the polymerization product of a mixture containing about 60% to 75% by weight of butadiene-1,3; about 15% to 25% by weight of para-methyl-alpha-methylstyrene; and about 5% to 15% by weight of the vinyl esters of linseed oil acids.

3. A composition of matter comprising the polymerization product of a mixture containing about 60% to 75% by weight of butadiene-1,3; about 15% to 25% by weight of styrene; and about 5% to 15% by weight of the vinyl esters of linseed oil acids.

4. A composition of matter comprising the polymerization product of a mixture containing about 60% to 75% by weight of butadiene-1,3; about 15% to 25% by weight of acrylonitrile; and about 5% to 15% by weight of the vinyl esters of linseed oil acids.

5. In the process of manufacturing polymerization products, the step of polymerizing about 60% to 75% by weight of butadiene-1,3; about 15% to 25% by weight of a compound selected from the group consisting of styrene, methylstyrene, para-methyl-alpha-methylstyrene, and acrylonitrile; and about 5% to 15% by weight of the vinyl esters of linseed oil acids.

6. A composition of matter comprising the polymerization product of a mixture containing at least about 50% by weight of an open chain aliphatic conjugated diene; about 15% to about 35% by weight of para-methyl-alpha-methylstyrene; and about 5% to 15% by weight of the vinyl esters of a monocarboxylic aliphatic acid containing at least 12 and not more than 24 carbon atoms and selected from the group consisting of saturated unsubstituted acids, unsubstituted acids having ethylenic unsaturation as the only unsaturation, and unsaturated acids having a hydroxy group as the only substitution and having ethylenic unsaturation as the only unsaturation.

7. A composition of matter comprising the polymerization product of at least about 50% by weight of an open chain aliphatic conjugated diene; about 15% to about 35% by weight of a compound of the group consisting of styrene, methylstyrene, para-methyl-alpha-methylstyrene, and acrylonitrile; and about 5% to 15% by weight of a vinyl ester of a monocarboxylic aliphatic acid containing at least 12 and not more than 24 carbon atoms and selected from the group consisting of saturated unsubstituted acids, unsubstituted acids having ethylenic unsaturation as the only unsaturation, and unsaturated acids having a hydroxy group as the only substitution and having ethylenic unsaturation as the only unsaturation.

8. A composition of matter comprising the polymerization product of a mixture containing about 60% to 75% by weight of an open chain aliphatic conjugated diene; about 15% to 25% by weight of a compound of the group consisting of styrene, methylstyrene, para-methyl-alpha-methylstyrene, and acrylonitrile; and about 5% to 15% by weight of a vinyl ester of a monocarboxylic aliphatic acid containing at least 12 and not more than 24 carbon atoms and selected from the group consisting of saturated unsubstituted acids, unsubstituted acids having ethylenic unsaturation as the only unsaturation, and unsaturated acids having a hydroxy group as the only substitution and having ethylenic unsaturation as the only unsaturation.

9. A composition of matter comprising a rubberlike tripolymer obtained by polymerizing a mixture containing about 60% to 75% by weight of butadiene-1,3; about 15% to 25% by weight of a compound of the group consisting of styrene, methylstyrene, para-methyl-alpha-methylstyrene, and acrylonitrile; and about 5% to 15% by weight of a vinyl ester of a monocarboxylic aliphatic acid containing at least 12 and not more than 24 carbon atoms and selected from the group consisting of saturated unsubstituted acids, unsubstituted acids having ethylenic unsaturation as the only unsaturation, and unsaturated acids having a hydroxy group as the only substitution and having ethylenic unsaturation as the only unsaturation.

10. A composition of matter comprising a rubberlike tripolymer obtained by the polymerization of a mixture containing about 60% to 75% by weight of butadiene-1,3; about 15% to 25% by weight of para-methyl-alpha-methylstyrene; and about 5% to 15% by weight of the vinyl esters of a monocarboxylic aliphatic acid containing at least 12 and not more than 24 carbon atoms and selected from the group consisting of saturated unsubstituted acids, unsubstituted acids having ethylenic unsaturation as the only unsaturation, and unsaturated acids having a hydroxy group as the only substitution and having ethylenic unsaturation as the only unsaturation.

11. A composition of matter comprising a rubberlike tripolymer obtained by the polymerization of a mixture containing about 60% to 75% by weight of butadiene-1,3; about 15% to 25% by weight of acrylonitrile; and about 5% to 15% by weight of a vinyl ester of a monocarboxylic aliphatic acid containing at least 12 and not more than 24 carbon atoms and selected from the group consisting of saturated unsubstituted acids, unsubstituted acids having ethylenic unsaturation as the only unsaturation, and unsaturated acids having a hydroxy group as the only substitution and having ethylenic unsaturation as the only unsaturation.

12. In a method of manufacturing rubberlike polymerization products, the step of polymerizing in an aqueous emulsion a mixture containing at least about 50% by weight of an open chain aliphatic conjugated diene; about 15% to about 35% by weight of a compound of the group consisting of styrene, methylstyrene, para-methyl-alpha-methylstyrene, and acrylonitrile; and about 5% to 15% by weight of a vinyl ester of a monocarboxylic aliphatic acid containing at least 12 and not more than 24 carbon atoms and selected from the group consisting of saturated unsubstituted acids, unsubstituted acids having ethylenic unsaturation as the only unsaturation, and unsaturated acids having a hydroxy group as the only substitution and having ethylenic unsaturation as the only unsaturation.

13. In the process of manufacturing rubberlike polymerization products, the step of polymerizing in an aqueous emulsion a mixture containing at least about 50% by weight of butadiene-1,3; about 15% to about 35% by weight of a compound of the group consisting of styrene, methylstyrene, para-methyl-alpha-methylstyrene, and acrylonitrile; and about 5% to 15% by weight of a vinyl ester of a monocarboxylic aliphatic acid containing at least 12 and not more than 24 carbon atoms and selected from the group consisting of saturated unsubstituted acids, unsubstituted acids having ethylenic unsaturation as the only unsatration, and unsaturated acids having a hydroxy group as the only substitution and having ethylenic unsaturation as the only unsaturation.

14. The product obtained by the vulcanization of a rubberlike tripolymer produced by the polymerization of a mixture containing at least about 50% by weight of an open chain aliphatic conjugated diene; about 15% to about 35% by weight of a compound of the group consisting of styrene, methylstyrene, para-methyl-alpha-methylstyrene, and acrylonitrile; and about 5% to 15% by weight of a vinyl ester of a monocarboxylic aliphatic acid containing at least 12 and not more than 24 carbon atoms and selected from the group consisting of saturated unsubstituted acids, unsubstituted acids having ethylenic unsaturation as the only unsaturation, and unsaturated acids having a hydroxy group as the only substitution and having ethylenic unsaturation as the only unsaturation.

15. A vulcanized rubberlike material obtained by the vulcanization of a rubberlike tripolymer obtained by the polymerization of about 165 parts of butadiene-1,3; about 65 parts by weight of para-methyl-alpha-methylstyrene; and about 25 parts by weight of the vinyl esters of linseed oil acids.

KARL H. WEBER.
PAUL O. POWERS.

REFERENCES CITED

The following references are of record in the file of this patent:

UNITED STATES PATENTS

| Number | Name | Date |
| --- | --- | --- |
| 2,118,864 | Reppe | May 31, 1938 |
| 2,228,365 | Reppe | Jan. 14, 1941 |
| 2,234,204 | Starkweather | Mar. 11, 1941 |
| 2,299,862 | Toissant | Oct. 27, 1942 |
| 2,300,566 | Hahn | Nov. 2, 1942 |
| 2,419,202 | D'Alelio | Apr. 22, 1947 |

Certificate of Correction

Patent No. 2,518,509                                        August 15, 1950

KARL H. WEBER ET AL.

It is hereby certified that error appears in the printed specification of the above numbered patent requiring correction as follows:

Column 3, line 1, for the word "compound" read *component*;

and that the said Letters Patent should be read as corrected above, so that the same may conform to the record of the case in the Patent Office.

Signed and sealed this 24th day of October, A. D. 1950.

[SEAL]

THOMAS F. MURPHY,
*Assistant Commissioner of Patents.*